Aug. 8, 1939.   D. D. MYERS   2,168,679
SHOCK ABSORBER
Filed Sept. 12, 1936   2 Sheets-Sheet 1
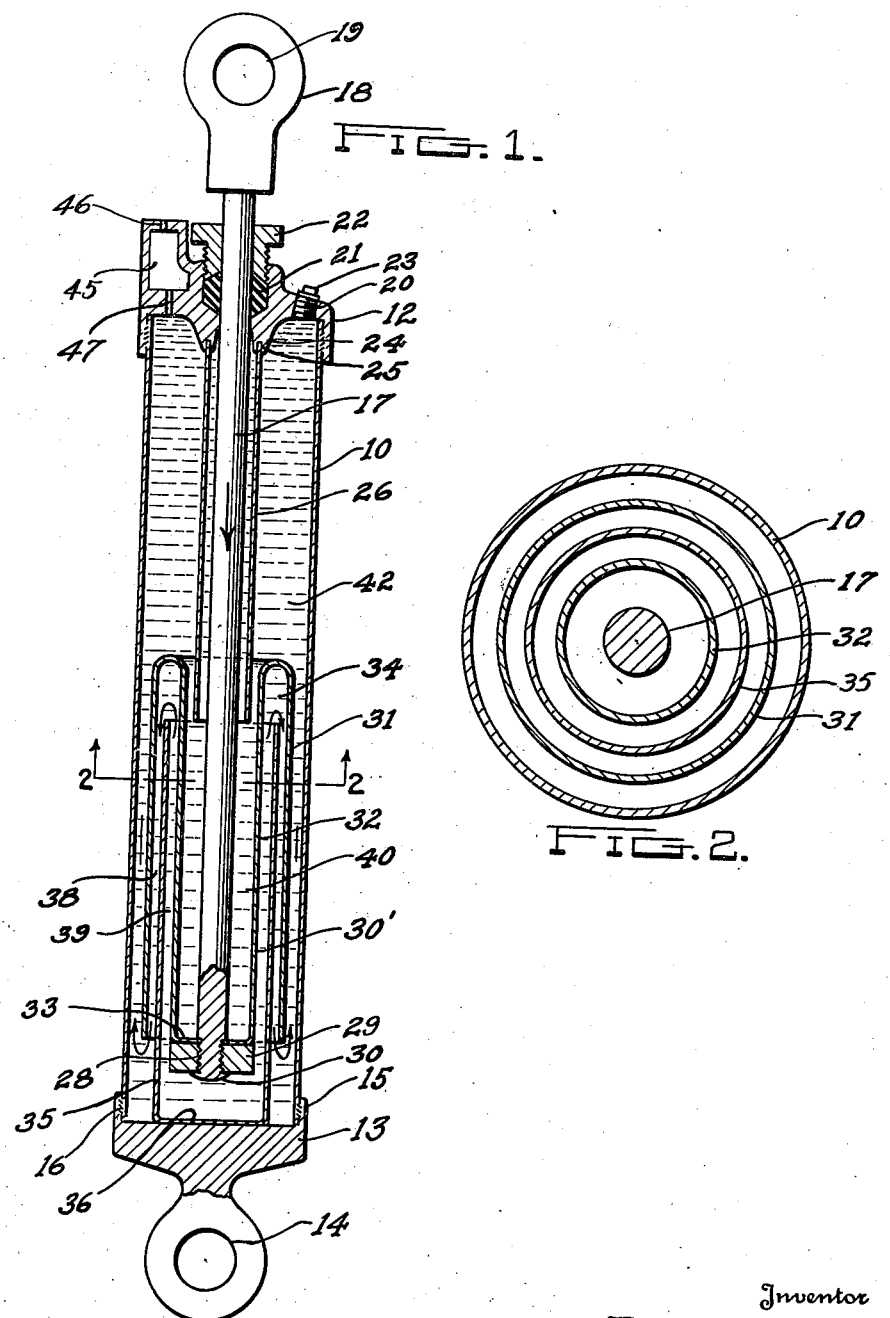
Inventor
Don D. Myers
By Braselton, Whitcomb Davies
Attorney Aug. 8, 1939.   D. D. MYERS   2,168,679
SHOCK ABSORBER
Filed Sept. 12, 1936   2 Sheets-Sheet 2

INVENTOR
DON D. MYERS
BY
Braselton, Whitcomb Davies
ATTORNEY

Patented Aug. 8, 1939

2,168,679

UNITED STATES PATENT OFFICE 2,168,679

SHOCK ABSORBER

Don D. Myers, Toledo, Ohio

Application September 12, 1936, Serial No. 100,399

5 Claims. (Cl. 188—88)

This invention relates to shock absorbing devices and more particularly to an improved form of direct acting fluid shock absorber.

The invention contemplates the provision of a shock absorber wherein a plurality of relatively movable sets of baffles cooperate to provide a series of channels for fluid flow in alternate directions upon movement of the baffles, the resistance of the fluid to move in the channels being utilized as the resistant or shock absorbing force.

An object of the invention is to provide simple yet effective shock absorbing means of the hydraulic type which may be inexpensively manufactured in which the major number of parts are fabricated of sheet metal or the like as the arrangement of my invention eliminates pistons, valves and the like, as well as to render accurate workmanship unnecessary in the fabrication and assembly of the parts of the device of my invention.

A further object of the invention is the provision of a series of relatively stationary and movable sets of baffles which are arranged in overlapping relationship forming a plurality of labyrinthian passages wherein the flow of fluid is in alternate directions through said passages or channels, the tendency of the fluid to resist rapid passage or change of direction of flow through the channels serving to provide the necessary shock absorbing resistance without the use of restricted bypasses, valves or the like.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

Figure 1 is a vertical sectional view showing one embodiment of the shock absorber of my invention;

Figure 2 is a transverse sectional view taken substantially on the line 2—2 of Figure 1;

Figure 3:
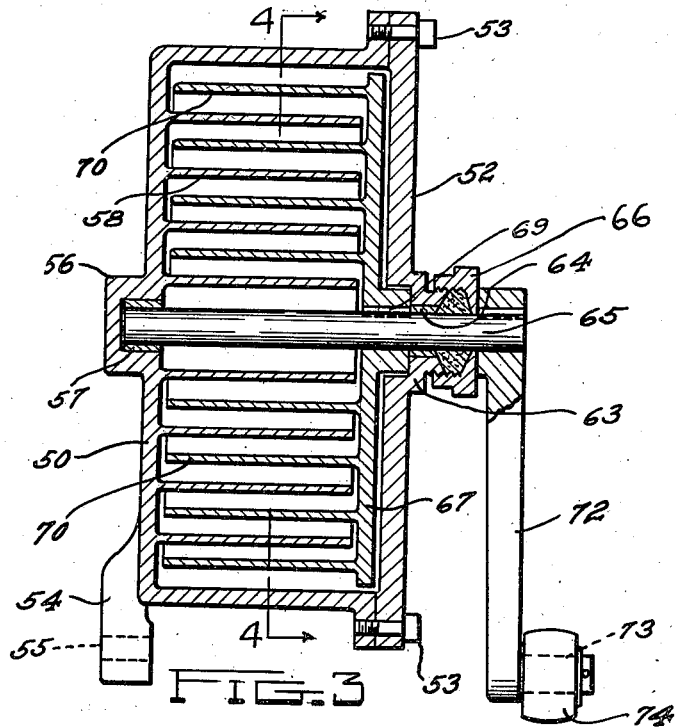
Figure 3 is a vertical sectional view illustrating another form of my invention.

Referring to the drawings in detail, the shock absorbing device of my invention is provided with a housing or casing 10 of cylindrical configuration and preferably fabricated of sheet steel or the like over the extremities of which are fitted the end heads or closures 12 and 13. The closure 13 is provided with an eye 14 or other suitable configuration for attachment to one portion of a vehicle as for example, the frame, the member 13 being provided with an annular flange 15 into which the cylindrical member 10 extends, being welded as at 16 or otherwise fixedly secured to member 13. The head portion 12 is provided with a central bore through which passes a rod 17 having at one extremity a member 18 formed with an eye 19 or other suitable means for attachment to another portion of the vehicle as, for example, a spring or axle. The head portion 12 is bored to receive a packing material 21 forming a stuffing gland for effecting a seal between the head portion 12 and the rod 17, the packing being held in place by means of a threaded bushing 22. An opening 20 is also provided in head 12 to receive a filler plug 23 to provide a suitable means for filling the casing 10 with fluid.

In the arrangement disclosed in the utilization of the shock absorbing means of my invention, the eyes 14 and 19 are connected to portions of the vehicle which are relatively movable with respect to each other, the shock absorbing device offering resistance to such movement in a manner to be hereinafter described. The head portion 12 in the embodiment illustrated is provided with a depending central portion 24 which is provided with an annular groove 25 to receive the upper extremity of a cylindrical sleeve 26 formed of sheet metal or other suitable material which is pressed or otherwise secured in the groove 25 so as to be permanently fixed to the head portion 12. The lower end of the rod 17 is threaded as at 28 or otherwise arranged to receive an abutment or nut 29, the end of the rod being swaged as at 30 or otherwise fabricated to hold the abutment 29 in place. The rod 17 carries an inverted annular cup-like member 30' having spaced cylindrical concentric walls 31 and 32 and an inwardly extending flange portion 33 which is welded or otherwise secured to the abutment 29.

Secured to the head portion 13 as by welding or other suitable means is a cylindrical sleeve 35 having a bottom portion 36 secured to the head portion 13. The diameter of the sleeve 35 is of such dimension that the sleeve divides the annular space 34 formed by the walls 31 and 32 into annular chambers 38 and 39 by reason of the projection of the sleeve 35 into chamber 30. The inner wall 32 of member 30 is spaced from the exterior surface of rod 17 which forms a cup-like chamber 40 and upon relative movement of rod 17 with respect to the casing 10 the cylindrical baffle 26 is projected downwardly into the chamber 40 forcing the fluid or liquid 42 through the channels or interstices between the several baffles. The case 10 is preferably entirely filled with fluid as, for example, oil or the like so that any relative movement between the rod 17 and casing 10 will cause a movement of fluid in reversed directions through the channels formed by the interlocking baffle plates and as the fluid is compelled to travel through such small channels over a considerable distance in a short period of time, the inertia of the fluid coupled with friction of the fluid therefore resists the relative movement between the sets of baffle plates which provides the effective shock absorbing resistant force.

Member 12 is formed with a chamber 45 which has a vent opening 46 to the atmosphere and an opening 47 communicating with the interior of the casing 10. The purpose of chamber 45 is to accommodate the volumetric change due to the reciprocal movement of rod 17 into and out of the casing, air being exhausted from or taken into chamber 45 through the vent 46 open to the atmosphere upon movement of the rod 17.

It is to be noted that in the construction of this nature if it is desired to increase the shock absorbing resistant force, more interlocking baffle plates may be utilized but I have found that the arrangement of baffle plates disclosed gives satisfactory operation. Thus, in a construction of this nature the dimensions of the baffle plates do not have to be held to any high degree of accuracy as there is considerable space between the interlocking baffle plates and slight variations in dimensions will not therefore affect the operation of the device.

Figure 4:
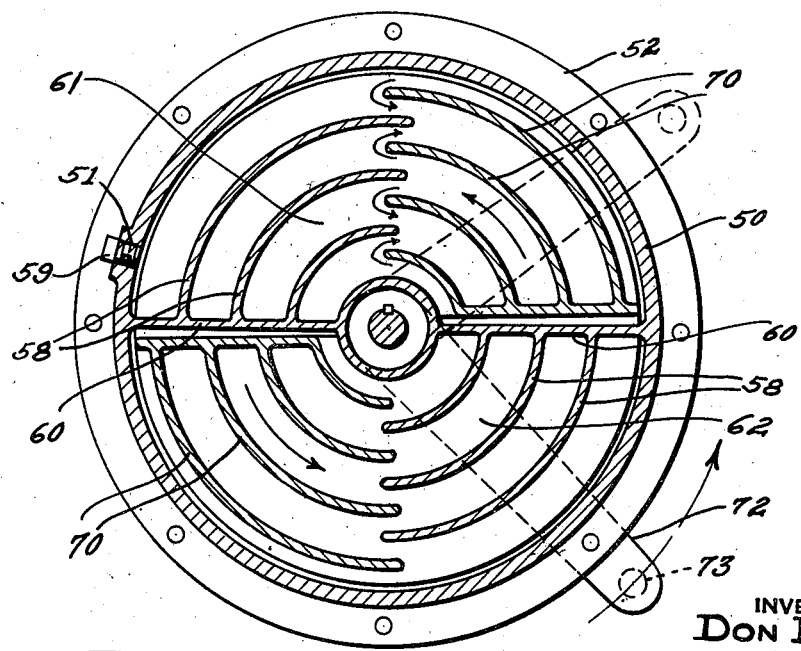
Figure 4 is a sectional detail view taken substantially on a line 4—4 of Figure 3.

Referring to the form of the invention illustrated in Figures 3 and 4, a housing or casing 50 of cylindrical configuration is formed with an open end which is closed by means of a circular plate 52 secured thereto by means such as screws 53. The casing 50 is preferably formed with one or more ears or projections 54 each having an opening 55 therein to receive means such as a bolt (not shown) to secure the structure to a vehicle frame or chassis. The casing 50 is also formed with a boss portion or bearing support 56 adapted to accommodate a bearing 57. The wall of casing 50 is provided with an opening 51 to receive a suitable filler plug 59.

Interiorly of the casing 50 a plurality of arcuate fins or baffles 58 are provided in fixed position which extend in opposite directions from a wall portion 60. The wall 60 preferably divides the interior of casing 50 in two compartments 61 and 62, which are filled with a suitable fluid. The end plate 52 is formed with a central projection 63 having an opening therein to receive a bearing 64 arranged in axial alignment with the bearing 57 when the structure is assembled. The bearings 57 and 64 support a shaft 65 to which is fixedly secured a plate 67 by means of a key 69. A stuffing gland 66 is provided to prevent leakage of fluid from the interior of the housing 50. The plate 67 is formed with a plurality of arcuate fins or baffle members 70 arranged to be received in compartments 61 and 62 so that they cooperate with the baffles 58 to form a plurality of channels.

At one end of shaft 65 is secured an arm 72 in a suitable manner. The arm is connected as at 73 to a link 74 which may be suitably connected to a vehicle wheel carrying member (not shown). Thus, rotation of shaft 65 through the arm 72 or movement of casing 50 through its connection 54 to the vehicle, causes relative movement between the casing and plate 67. Such movement causes the flow of fluid through the channels formed by the baffles 58 and 70, and as in the other form of the invention, the resistance to the flow of fluid and the inertia of the fluid to flow or to change its direction of movement provides the resistance for the shock absorbing action.

It is apparent that within the scope of the invention, modifications and different arrangements may be made other than is herein disclosed, and the present disclosure is illustrative merely, the invention comprehending all variations thereof.

What I claim is:

1. In a shock absorber the combination of a cylindrical casing having a head member at each end thereof; a tubular baffle carried by each of said head members; said baffles being of different diameters; a rod movably positioned within said casing substantially centrally of said baffles; and a baffle carried by said rod and cooperating with said tubular baffles to control the flow of fluid in said casing upon movement of said rod.

2. In a shock absorber the combination of a cylindrical casing having a head member at each end thereof; a stationary baffle carried by each of said head members; said baffles being of different diameters; a rod movably positioned within said casing substantially centrally of said baffles; and a baffle carried by said rod and cooperating with said stationary baffles to control the flow of fluid in said casing upon movement of said rod.

3. In a vehicle shock absorber the combination of a cylindrical casing having a head member at each end thereof; means to secure one of the head members to the vehicle; a tubular baffle carried by each of said head members, said baffles being of different diameters; a rod movably positioned within said casing substantially centrally of said baffles; means to secure said rod to the vehicle; and a baffle carried by said rod and cooperating with said tubular baffles to control the flow of fluid in said casing upon movement between said securing means.

4. In a vehicle shock absorber the combination of a housing for a supply of fluid; a rod; a wall of said housing having an opening through which said rod is movable; a stuffing gland for effecting a seal between said rod and said housing; a baffle secured to the wall of said housing through which said rod moves; and a baffle carried by said rod, said baffles cooperating to vary the flow of fluid in said housing upon movement of said rod.

5. In a shock absorber the combination of a housing for a supply of fluid; a rod; an opening in said housing through which said rod is movable; a stuffing gland for effecting a seal between said rod and said housing; a plurality of baffles secured to said housing and positioned in opposed relation; and a baffle carried by said rod, said baffles cooperating to vary the flow of fluid in said housing upon movement of said rod.

DON D. MYERS.